United States Patent [19]
Kim et al.

[11] Patent Number: 5,542,074
[45] Date of Patent: Jul. 30, 1996

[54] PARALLEL PROCESSOR SYSTEM WITH HIGHLY FLEXIBLE LOCAL CONTROL CAPABILITY, INCLUDING SELECTIVE INVERSION OF INSTRUCTION SIGNAL AND CONTROL OF BIT SHIFT AMOUNT

[75] Inventors: Won S. Kim, Fremont; John R. Nickolls, Los Altos, both of Calif.

[73] Assignee: MasPar Computer Corporation, Sunnyvale, Calif.

[21] Appl. No.: 965,938

[22] Filed: Oct. 22, 1992

[51] Int. Cl.[6] ............................................. G06F 15/76
[52] U.S. Cl. .......................................... 395/800; 395/375
[58] Field of Search ............................ 395/800, 375, 395/700, 200; 364/716, 748

[56] References Cited

U.S. PATENT DOCUMENTS

| | | | |
|---|---|---|---|
| 3,970,993 | 7/1976 | Finnila | 395/800 |
| 3,979,728 | 9/1976 | Reddaway | 395/800 |
| 4,314,349 | 2/1982 | Batcher | 364/716 |
| 4,380,046 | 4/1983 | Fung | 395/800 |
| 4,709,327 | 11/1987 | Hillis et al. | 395/375 |
| 4,933,895 | 6/1990 | Grindberg et al. | 364/748 |
| 5,045,995 | 9/1991 | Levinthal et al. | 395/275 |
| 5,187,795 | 2/1993 | Balmforth et al. | 395/800 |

FOREIGN PATENT DOCUMENTS

| | | |
|---|---|---|
| WO91/10200 | 11/1991 | WIPO . |
| WO91/10197 | 11/1991 | WIPO . |

OTHER PUBLICATIONS

Duff, "Prallel Processors for Digital Image Processing," printed in Stucki, *Advances in Digital Image Processing--Theory, Application, Implementation* (Plenum Press, New York), 1979, pp. 265–276, as procs. of Int'l Symp. on Advances in Digital Image Processing, 26–28 Sep. 1978.

Blank et al, "A Parallel Bit Map Processor Architecture for DA Algorithms", 18th Design Automation Conf., 1981, pp. 837–845.

Wagner, "The Boolean Vector Machine [BVM]", 10th Ann. Int'l Symp on Comp. Arch, 13–16 Jun. 1983, pp. 59–66.

Mead et al, *Inroduction to VLSI Systems* (Addison–Wesley, Menlo Park, Calif.), 1980, pp. 157–163.

Structured Computer Organization Prentice Hall 1990, 1984, 1976 pp. 170–172 pp. 512–519.

*Primary Examiner*—Kevin J. Teska
*Assistant Examiner*—Dan Fiul
*Attorney, Agent, or Firm*—Skjerven, Morrill, MacPherson, Franklin & Friel; Alan H. MacPherson; Ronald J. Meetin

[57] ABSTRACT

A parallel processor system which operates in a single-instruction multiple-data mode has a highly flexible local control capability for enabling the system to operate fast. The system contains an array of processing elements or PEs ($12_1$–$12_N$) that process respective sets of data according to instructions supplied from a global control unit (20). Each instruction is furnished simultaneously to all the PEs. One local control feature (52) entails selectively inverting certain instruction signals according to a data-dependent signal. Another local control feature (48) involves controlling the amount of a bit shift in a barrel shifter (98) according to a data-dependent signal.

10 Claims, 10 Drawing Sheets

TO/FROM FIG. 5b

PARALLEL PROCESSOR SYSTEM WITH HIGHLY FLEXIBLE LOCAL CONTROL CAPABILITY, INCLUDING SELECTIVE INVERSION OF INSTRUCTION SIGNAL AND CONTROL OF BIT SHIFT AMOUNT

FIELD OF THE INVENTION

This invention relates to local control in parallel processor systems that operate in a single-instruction multiple-data ("SIMD") mode.

BACKGROUND OF THE INVENTION

A parallel processor based on the concurrent execution of the same global instruction by a large number of relatively simple processing elements ("PEs") is conventionally referred to as a single-instruction multiple-data machine. A SIMD processor is useful in applications such as image processing, artificial intelligence, data-base operations, matrix operations, and simulations.

In pure SIMD, each instruction is executed exactly the same on the data in each PE. However, in many applications, it is desirable that certain instructions be executed differently in different PEs depending on information, such as control or flag bits, supplied to or produced in the PEs. This is commonly referred to as "local control".

Batcher, U.S. Pat. No. 4,314,349, discloses a prior art massively parallel SIMD processor system having a primitive local control capability. The processor system in Batcher contains an array of 16,384 PEs, an array control unit ("ACU") for controlling the PEs, and an interconnection network that enables the PEs to communicate with one another. Each PE consists of an individual processor and a local memory. The ACU furnishes instructions for the PEs to execute in parallel on respective data streams.

Local control in each PE in Batcher is performed with a single control bit stored in a dedicated one-bit local control register. The value of the local control bit can differ from PE to PE—i.e., the control bit can be a logical "1" (hereafter simply "1") in some PEs and a logical "0" (hereafter simply "0") in other PEs. The control bit, in combination with a pair of global override signals supplied from the ACU, controls the clocking of certain registers in each PE.

More specifically, the control bit and one of the global override signals drive a NAND gate that controls the clocking of registers in the arithmetic sub-unit of the PE's processor. When the global override signal for the arithmetic sub-unit is "0" the registers in the arithmetic sub-unit are clocked only if the control bit is "1". If the control bit is "0" the registers in the arithmetic sub-unit are not clocked. This prevents data from being loaded into those registers and thereby disables the arithmetic sub-unit. When the global override signal for the arithmetic sub-unit is "1" all of its registers are clocked regardless of the control bit value. The control bit and the other global override signal drive another NAND gate that similarly controls the clocking of a register for the processor's logic sub-unit.

The dedicated type of local control described in Batcher involves only a single level of conditional execution. A more sophisticated type of local control entails nesting one level of conditional execution on another level of conditional execution, as arises in conditionally executing a statement, such as an IF-THEN-ELSE statement, that itself is conditional.

In prior art SIMD machines that have this two-level nesting type of local control, a single control bit stored in a dedicated one-bit control register is again typically used in implementing the local control. The control bit is initially set at "1" in a selected group of the PEs in such a SIMD system. This enables the selected PEs to execute an IF-THEN-ELSE statement. The control bit is initially set at "0" in the remaining PEs and disables them from executing the IF-THEN-ELSE statement.

Execution of the IF-THEN-ELSE statement in a selected PE is initiated by transferring (saving) the value of the control bit to a non-dedicated general-purpose working register elsewhere in the PE. The selected PE then calculates the IF condition of the statement and stores the "1" or "0" result in the control register. All of the selected PEs with the control bit at "1" execute the THEN portion of the statement. All of the selected PEs with the control bit at "0" are temporarily disabled.

Next, the value of the control bit is inverted in the selected PEs (only). Each selected PE whose control bit was at "1" during the THEN portion of the IF-THEN-ELSE statement now has its control bit at "0" and vice versa All of the selected PEs with the control bit at "1" execute the ELSE portion of the statement. The selected PEs with the control bit now at "0" are temporarily disabled. Finally, the initial control bit value stored in the working register of each selected PE is transferred (restored) to its control register.

During periods when the initial value of the control bit in the selected PEs is being transferred from the control register to the working register and vice versa, the PEs are not performing arithmetic or logic operations. That is, the PEs are basically idle. The instruction execution cycles needed for these transfers are non-productive. Eliminating these non-productive execution cycles would be highly desirable.

Also, when an IF-THEN-ELSE statement is handled in the preceding way, only part of the selected PEs are active during the THEN portion. The remainder are idle. The same thing occurs during the ELSE portion. It would be desirable if the provisions of the THEN and ELSE portions could, under some circumstances, be executed simultaneously in the selected PEs. Considerable execution cycles would be saved. Furthermore, it would be desirable to have more flexible local control in which certain operations, such as data-bit shifts, could be performed at values dependent on data in each PE rather than on global values.

GENERAL DISCLOSURE OF THE INVENTION

The present invention centers around a parallel processor system that has a highly flexible local control capability for enabling the system to process multiple data streams very rapidly. In particular, the processor system of the invention contains an array of processing elements and a global control unit. The PEs process respective sets of data according to instructions supplied by the control unit in the form of global instruction signals. Each instruction is furnished in parallel to all the PEs for enabling the system to operate in a SIMD mode.

According to a first aspect of the invention, each PE contains a group of control registers dedicated for storing control bits used for locally controlling execution of instructions by the PE. One of the control bits is a primary control bit that stays logically the same during an IF-THEN-ELSE statement formed from a sequence of the instructions. Execution of the IF-THEN-ELSE statement by the PE is locally conditional on the value of the primary control bit unless it is overridden. Another of the control bits is a further control bit whose logical value changes in going from the THEN portion of the statement to the ELSE portion. Execution of each of the THEN and ELSE portions by the PE is locally conditional on the value of the further control bit unless it is overridden.

Note that the phrase "IF-THEN-ELSE statement" is to be interpreted broadly as covering any sequence of instructions which prescribe that a certain action be taken if a specified condition is met and that another action, including no action, be taken if the specified condition is not met. For example, the phrase "IF-THEN-ELSE" statement here encompasses instruction sequences (or appropriate portions thereof) commonly referred to as SWITCH or CASE statements. Also, one or more IF-THEN-ELSE statements may be nested within either or both of the THEN and ELSE portions of an IF-THEN-ELSE statement.

The values of the primary control bit determine which PEs are selected to execute an IF-THEN-ELSE statement and which PEs do not execute the statement. The values of the further control bit determine which selected PEs execute the THEN portion of the statement and which selected PEs execute the ELSE portion. Consequently, the two control bits furnish a complete capability to locally control execution of the IF-THEN-ELSE statement.

Because dedicated registers are used to store both control bits, there is no need to employ execution cycles for transferring the initial value of a control bit to a working register prior to an IF-THEN-ELSE statement and then transferring the initial bit value back to a control register at the end of the statement. The processing system of the invention can thereby execute an IF-THEN-ELSE statement considerably faster than in the SIMD prior art described above.

Each PE includes an individual processor unit that processes input information to produce an output bit. In a preferred implementation of this local control capability, the value of the processor output bit is loadable into each control register. The PE further includes a selection circuit (such as a multiplexer) and a logic circuit. The selection circuit provides a selected bit that logically follows either the processor output bit or the further control bit. The logic circuit generates a local control signal in response to the selected bit, the primary control bit, and at least one of the global instruction signals from the control unit. The local control signal is typically used to control the clocking of one or more registers in the PE.

Usage of the selection circuit according to the invention enables the overall processor system to operate very fast. In particular, system operation during an IF-THEN-ELSE statement normally begins with the primary control bit loaded into a primary one of the dedicated control registers in each PE. The processor unit in each selected PE then calculates the IF condition and supplies the processor output bit at a value logically equal to the calculated value of the IF condition. The value of the processor output bit is loaded into a further one of the dedicated control registers.

The value of the processor output bit is preferably allowed to pass through the selection circuit during the calculation of the IF condition. Consequently, the processor output signal can temporarily be used as a "substitute" for the further control bit while the calculated value of the IF condition is being loaded into the further control register. The conditional execution of the THEN portion can begin during the same execution cycle as the calculation of the IF condition. There is no need to delay starting execution of the THEN portion by one execution cycle while waiting for the further control bit to be loaded.

In going from the THEN portion of the statement to the ELSE portion, the same procedure can be employed to avoid expending an execution cycle between the THEN and ELSE portions while the value of the further control bit is being changed. The result is that either the THEN or ELSE portion is being executed in the processor system during all the execution cycles. The execution-cycle usage efficiency is very high.

According to another aspect of the invention, the PE contains an individual processor unit responsive to processor instruction signals for processing incoming data. The processor unit in this aspect of the invention may be a different circuit from the processor unit in the first-mentioned aspect of the invention. The PE in the second aspect of the invention further includes a local control circuit responsive to a data-dependent signal furnished in the PE for selectively inverting one of the global instruction signals to produce a local instruction signal that constitutes one of the processor instruction signals. Because this particular processor instruction signal is generated in a data-dependent manner, its value can differ from PE to PE. This provides a valuable type of local control.

Certain types of arithemetic procedures involve performing one of two basically inverse steps. For example, consider "2's complement" arithmetic in which subtraction is done by adding the inverse (or complement) of the subtrahend. If "2's complement" addition is to be done in certain PEs while "2's complement" subtraction is to be done in other PEs, both the addition and subtraction can be performed simultaneously by using the local control capability furnished in the second aspect of the invention. The processor speed is increased significantly.

According to a third aspect of the invention, each PE contains register circuitry, a shifting circuit, and a local control circuit. The register circuitry stores an original multi-bit word. The shifting circuit is operable to shift the bits in the original word to produce a new multi-bit word containing a portion of the bits in the original word shifted to the left or right by a specified amount. The local control circuit controls the shift amount according to a data-dependent signal furnished in the PE. Due to this data dependency, the shift amount can differ from PE to PE to provide another valuable type of local control.

More specifically, the data-dependent shifting achieved with the local control in this aspect of the invention permits fast normalization of floating-point operands in a SIMD architecture. Integer multiplication by powers of two can also be done very rapidly.

The three local control features of the invention are fully compatible with one another and can be employed in the same SIMD processor system. The overall local control capability of the invention is much more flexible than in the prior art and allows the system to operate considerably faster.

BRIEF DESCRIPTION OF THE DRAWINGS

Like reference symbols are used in the drawings and in the description of the preferred embodiments to represent the same or very similar item or items.

Figure 1:
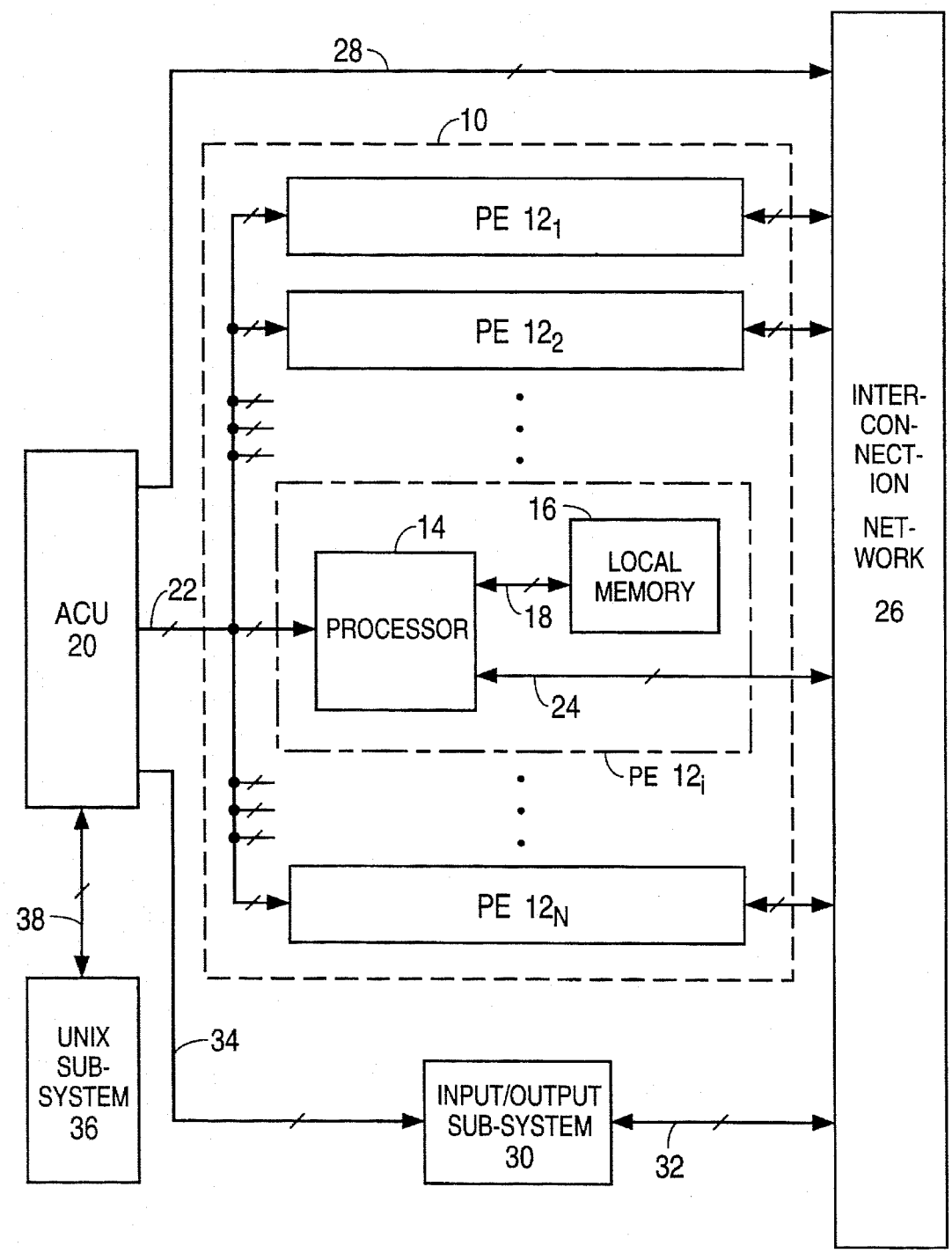
FIG. 1 is a block diagram of a massively parallel SIMD processor system into which the local control features of the invention can be incorporated.

A slash (/) through a line carrying a signal indicates that the signal is a group of signals. Likewise, a slash through a logic gate indicates that the logic gate is actually a group of logic gates. A number next to such a slash denotes the actual number of signals or gates.

Signals shown as entering registers from the left are clocking inputs.

In the drawings, "SB" and "MB" respectively identify single-bit and multi-bit registers. "D-P" means data-path. "NW" means network. "MSB" and "LSB" respectively mean most significant bit and least significant bit.

DESCRIPTION OF THE PREFERRED EMBODIMENTS

Referring to the drawings, FIG. 1 illustrates a general SIMD parallel processor system that can be locally controlled according to the teachings of the invention. This processor contains an array 10 of N identical processing elements $12_1$, $12_2$, ... $12_N$. N is a large number (e.g., 16,384). Each PE $12_i$, where i is a running integer, consists of a processor 14 and a local memory 16 that communicate bi-directionally with each other via a data bus 18. Memory 16 is of the random-access type.

An array control unit (again, "ACU") 20 furnishes instructions to control operation of PEs $12_1$–$12_N$ (collectively "12"). The instructions are supplied in the form of global instruction signals transmitted on an instruction bus ("IBUS") 22 from ACU 20 to processors 14 in PEs 12. Each instruction is furnished simultaneously to all of PEs 12 to enable the system to operate in a SIMD mode. ACU 20 also provides control signals to memories 16 along signal paths not shown in FIG. 1.

Processor 14 in each PE $12_i$ processes input data supplied on bus 18 and on a data bus 24 to produce output data according to the instructions. The output data is furnished on bus 18 for storage in memory 16 and on bus 24 for transmission to other PEs 12 by way of an interconnection network 26. ACU 20 furnishes controls to interconnection network 26 along a control bus 28. PCT Patent Publications WO 91/10197 and WO 91/10200 together illustrate a typical example of the way in which components 20 and 26 can generally be implemented.

Information is supplied to and received from the processor system via an input/output sub-system 30 that communicates bi-directionally with network 26 along a data bus 32. ACU 20 supplies control signals to sub-system 30 along a control bus 34. Users interact with the processor system by way of a UNIX (registered trademark) operating-system sub-system 36 connected to ACU 20 via a bus 38.

Figure 2:
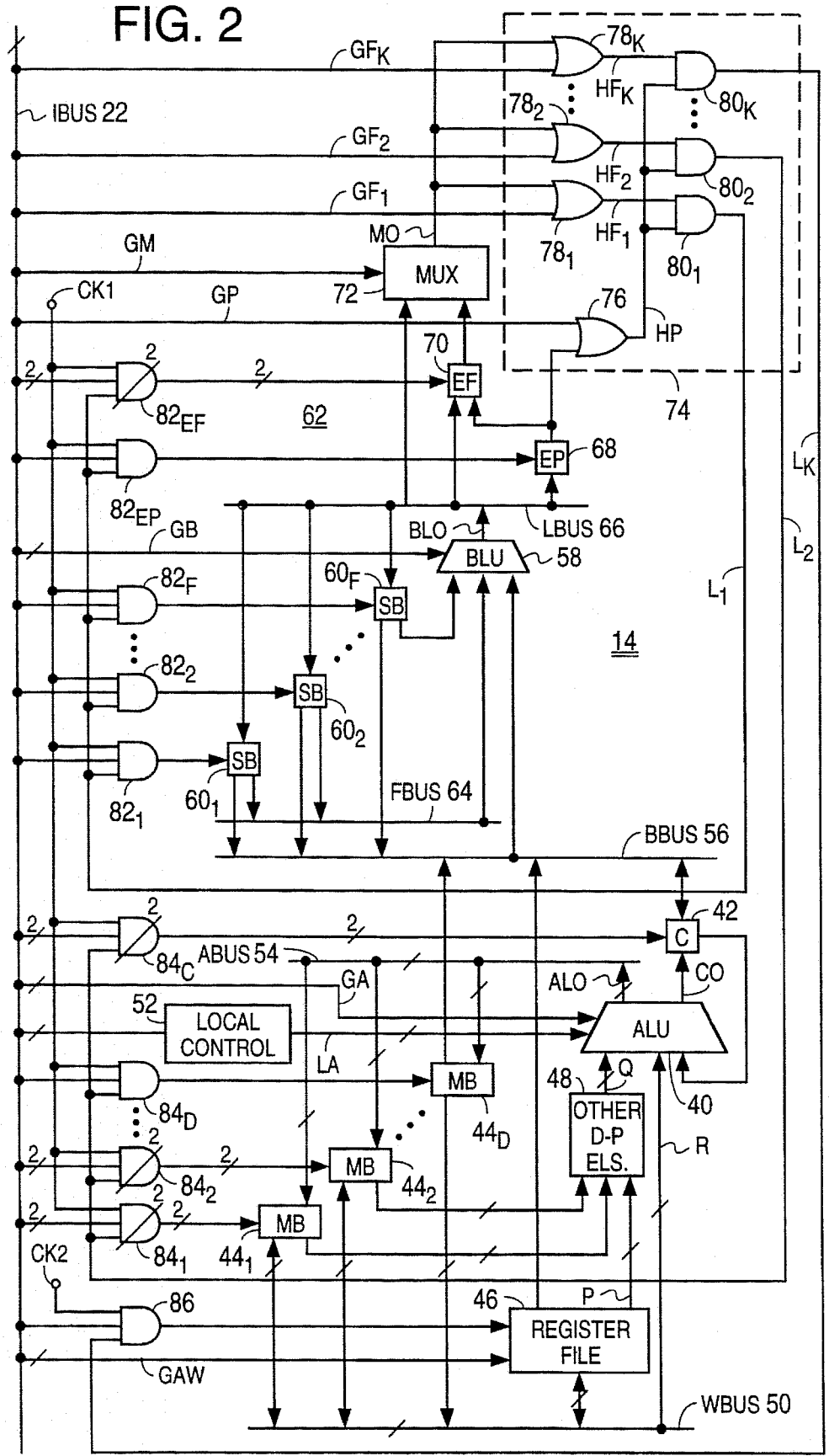
FIGS. 2, 3, and 4 are block/circuit diagrams of general implementations of processors that contain local control features according to the invention, each processor being suitable for use in the system of FIG. 1.

Turning to FIG. 2, it shows a general implementation of processor 14 in which a pair of control bits stored in dedicated one-bit registers are used in locally determining whether and how each PE $12_i$ (simply "12" from here on) executes an IF-THEN-ELSE statement created from a sequence of instructions. All global instruction signals described below are supplied on IBUS 22 from ACU 20 in FIG. 1. Processor 14 in FIG. 2 consists of a main processing section and a flag processing section.

The main processing section centers around an arithmetic logic unit ("ALU") 40 that performs multi-bit operations. In addition to ALU 40, the main processing section contains a one-bit register 42, D equal-size multi-bit working registers $44_1$, $44_2$, ... $44_D$, a multi-bit register file 46, and a group of other data-path elements 48. Working registers $44_1$–$44_D$ along with data-path elements 48, are employed in executing instructions. Register file 46, which stores data moving to and from memory 16 and network 26 in FIG. 1, also provides additional working storage space. Register file 46 is a physically integral part of processor 14, whereas local memory 16 may be located at a substantial distance away from processor 14.

ALU 40 receives a multi-bit data input signal Q from data-path elements 48, another multi-bit data input signal R from a multi-bit word bus ("WBUS") 50, and a one-bit data input signal C from register 42. ALU 40 performs arithmetic and logic operations on the incoming data in accordance with (a) global instruction signals GA and (b) local instruction signals LA provided from a local control circuit 52 discussed further in connection with FIG. 3. A multi-bit data output signal ALO is supplied from ALU 40 to a multi-bit ALU bus ("ABUS") 54.

A one-bit data output signal CO from ALU 40 can be clocked into C register 42. Bit CO constitutes the carry during arithmetic operations. Register 42 communicates bi-directionally with a one-bit bit bus ("BBUS") 56.

The ALU output on ABUS 54 can be clocked into any of working registers $44_1$–$44_D$. Each of registers $44_1$–$44_D$ communicates in various ways with other parts of processor 14. For example, FIG. 2 indicates that registers $44_1$ and $44_2$ communicate bi-directionally with WBUS 50 and that register $44_D$ communicates unidirectionally with WBUS 50 and BBUS 56. Multi-bit outputs from registers $44_1$ and $44_2$ are supplied as inputs to data-path elements 48 which receive another multi-bit input P from register file 46. In turn, register file 46 communicates bi-directionally with WBUS 50 and BBUS 56. Global instruction signals GAW consisting of address signals and a write-enable signal are supplied to register file 46.

The flag processing section is centered about a Boolean logic unit ("BLU") 58 that performs one-bit operations. The flag processing section further includes F one-bit flag registers $60_1$, $60_2$, ... $60_F$ and a local control circuit, generally identified by reference symbol "62", that controls whether and how processor 14 executes an IF-THEN-ELSE statement.

BLU 58 receives three one-bit inputs, two of which come from BBUS 56 and a one-bit flag bus ("FBUS") 64. BLU 58 performs Boolean logic operations on the incoming bits in response to global instruction signals GB. A one-bit output BLO is provided from BLU 58 to a one-bit logic bus ("LBUS") 66.

The BLU output on LBUS 66 can be clocked into any of registers $60_1$–$60_F$. Each of registers $60_1$–$60_F$ communicates in various ways with other parts of processor 14. For example, FIG. 2 indicates that the single bits in registers $60_1$ and $60_2$ can be loaded onto BBUS 56 and FBUS 64. The single bit in register $60_F$ can be loaded onto BBUS 56 and serves as the third input to BLU 58.

Turning to local control circuit 62, it contains a dedicated primary one-bit control register 68 that stores a primary control bit EP, a dedicated further one-bit control register 70 that stores a further control bit EF, a control multiplexer 72, and a logic circuit 74. The BLU output on LBUS 66 can be loaded into control (or flag) registers 68 and 70 to set the values of the EP and EF bits. The EP value can also be loaded into register 70 to set the value of the EF bit.

In response to a global instruction signal GM, control multiplexer 72 selects either the BLO or EF bit and provides a corresponding one-bit output signal MO. Logic circuit 74 produces K local control signals $L_1, L_2, \ldots L_K$ in response to bit EP, bit MO, a primary override global instruction signal GP, and K further override global instruction signals $GF_1, GF_2, \ldots GF_K$.

Logic circuit 74 consists of an OR gate 76, K OR gates $78_1, 78_2, \ldots 78_K$, and K AND gates $80_1, 80_2, \ldots 80_K$. Gate 76 generates a primary internal signal HP as the logical OR of control bit EP and global signal GP. Each gate $78_i$, where i is again a running integer, generates a further internal signal $HF_i$ as the logical OR of control bit EF and global signal $GF_i$. Each gate $80_i$ supplies local control signal $L_i$ as the logical OR of internal signals HP and $HF_i$. The net result is that logic circuit 74 furnishes each control signal $L_i$ as the logical AND of the EP and MO bits unless overridden by global signal GP or $GF_i$.

Each local control signal $L_i$ controls the clocking of one or more registers in processor 14 by way of one or more corresponding AND gates that also form part of control circuit 62. FIG. 2 illustrates a typical example in which control signals $L_1$, $L_2$, and $L_K$ are supplied to AND gates identified by reference symbols respectively beginning with "82", "84", and "86". These gates are collectively referred to as "clocking-control" gates since they all receive clock signals. In particular, a clock signal CK1 is provided to the "82" and "84" gates. A clock signal CK2 is supplied to gate 86. Each of the clocking-control gates also receives a global instruction signal.

In the illustrated example, control signal $L_1$ is furnished to clocking-control AND gates $82_1, 82_2, \ldots 82_F, 82_{EP}$, and $82_{EF}$ whose output signals respectively drive the clocking inputs of registers $60_1$–$60_F$, 68, and 70. Control signal $L_2$ is provided to clocking-control AND gates $84_1, 84_2, \ldots 84_D$ and $84_C$ whose output signals respectively drive the clocking inputs of registers $44_1$–$44_D$ and 42. Control signal $L_3$ is furnished solely to clocking-control AND gate 86 whose output drives the clocking input of register file 46. Note that one clocking-control AND gate is present for each data input (terminal) of each of these registers. Because certain of the registers have multiple data inputs, certain of the clocking-control AND gates are actually multiple gates.

If control signal $L_i$ for any particular register is "1" Clock CK (i.e., clock CK1 or clock CK2) can pass through the corresponding clocking-control AND gate to the associated clocking input of the register depending on the value of the global instruction signal supplied to that AND gate. If the global signal is "1" the register will be clocked and therefore can be loaded from the associated data input. If signal $L_i$ for the register is "0" clock CK is inhibited from passing through the corresponding clocking-control AND gate. The register will not be clocked from the clocking input driven from that AND gate and cannot be loaded from the corresponding data input.

Local control circuit 62 operates in the following manner when an IF-THEN-ELSE statement is presented over IBUS 22 to all of PEs 12. First assume that primary global signal GP and further global signals $GF_1$–$GF_K$ (collectively "GF") are initially in a non-override condition. That is, signals GP and GF are all at "0". Each control signal $L_i$ is then supplied from logic circuit 74 in each PE 12 as the logical AND of the EP and MO bits. The EF bit is usually at the same initial value as the EP bit.

Certain of PEs 12 are selected to execute the IF-THEN-ELSE statement whereas others are disabled from executing the statement. The determination of whether a particular PE 12 executes the IF-THEN-ELSE statement or not is done with the EP bit whose value remains logically the same—i.e., EP register 68 is not clocked—during the duration of the statement.

If the EP bit is "1" PE 12 is selected to execute the IF-THEN-ELSE statement. If the EP bit is "0" in PE 12, control signals $L_1$–$L_K$ are all "0" since global signal GP is "0". None of the registers shown in FIG. 2 will be clocked to receive input data. PE 12 is thereby disabled from executing the statement.

During the first instruction execution cycle of the IF-THEN-ELSE statement, BLU 58 calculates the IF condition in each PE 12 and supplies output BLO at a corresponding "1" or "0" value. Global signal GM is placed at a value that causes multiplexer 72 to select the BLO bit. MO is thus set logically equal to BLO.

If BLO/MO is "1" in a selected PE 12, control signals $L_1$–$L_K$ are all "1". Each selected PE 12 with its BLO bit at "1" executes the first cycle of the THEN portion of the statement. If BLO/MO is "0" in selected PE 12, signals $L_1$–$L_K$ are all "0" since global signals GF are all "0". As a result, each selected PE 12 with its BLO bit at "0" is disabled from executing the first cycle of the THEN portion.

The BLO value—i.e., the calculated value of the IF condition—is loaded into EF register 70 during the first execution cycle if the THEN portion requires more than one execution cycle to complete. Even though the EF bit does not reach the calculated IF value until the second execution cycle, the passage of the BLO value through multiplexer 72 enables control circuit 62 to function as if the EF bit were at the calculated IF value at the beginning of the first execution cycle. In other words, multiplexer 72 enables the BLU output to be used as a substitute for the EF bit during the first execution cycle so as to avoid having to expend an execution cycle while waiting for the BLO value to be loaded into EF register 70.

If more than one execution cycle is needed for the THEN portion, the value of global signal GM is inverted during the second execution cycle. With the EF bit now selected, MO becomes logically equal to EF.

If EF/MO is "1" in a selected PE 12, control signals $L_1$–$L_K$ are all "1". This causes PE 12 to execute the remainder of the THEN portion. Importantly, BLU 58 can be used during the remaining THEN execution since the EP and EF bits now control signals $L_1$–$L_K$ in the requisite way. If EF/MO is "0" each selected PE 12 is disabled from executing the remainder of the THEN portion.

During the first cycle after the THEN portion of the IF-THEN-ELSE statement, BLU 58 sets output BLO equal to the complement of the EF value. (BLU 58 effectively calculates the complement of the IF condition.) Global signal GM is again placed at a value that causes MO to be logically equal to BLO.

Each selected PE 12 with BLO/MO at "1" executes the first cycle of the ELSE portion of the statement. Each selected PE 12 with BLO/MO at "0" is disabled from executing the first cycle of the ELSE portion. Because BLO is now at a value opposite to that reached during the first cycle of the THEN portion of the statement, each selected PE 12 that executed the THEN portion does not execute the ELSE portion, and vice versa.

The BLO value is loaded into EF register 70 during the first execution cycle of the ELSE portion if it requires more than one cycle to complete. As with the THEN portion, this action avoids having to expend an extra cycle while waiting for EF register 70 to be loaded with the BLO value.

If more than one execution cycle is needed for the ELSE portion, the value of global signal GM is inverted during the second execution cycle of the ELSE portion. MO again becomes logically equal to EF.

Each selected PE 12 with EF/MO at "1" executes the remainder of the ELSE portion. Because the EP and EF bits now control signals $L_1$–$L_K$ in the desired manner, BLU 58 can be utilized for other activities during the remainder of the ELSE execution. Each selected PE 12 with EF/MO at "0" is disabled from executing the remainder of the ELSE portion.

The EP value is usually loaded into EF register 70 during the last cycle of the ELSE portion. This returns control circuit 62 to the initial condition and prepares each PE 12 for further instruction.

In some cases, the ELSE portion may not take any execution cycles. That is, there is no ELSE portion. If this occurs, the EP value is loaded into EF register 70 during the last cycle of the THEN portion.

The EP bit can be overridden by setting global signal GP to "1". Signal EF/BLO can be partly or totally overridden by setting one or more of global signals GF to "1". Adjusting signals GP and GF in this way leads to several different modes.

If GP is "1" with GF all at "0" all PEs 12 execute an IF-THEN-ELSE statement. The EF and BLO bits are used to determine which PEs 12 execute the THEN portion and which PEs 12 execute the ELSE portion in the same manner as described above. If desired, EP register 68 can be used as a general-purpose scratch register.

A mixed conditional mode arises if GP is "1" while GF are partly "0" and partly "1". The EF bit cannot be used to execute an IF-THEN-ELSE statement. Instead, all PEs 12 execute part of an instruction, while only certain PEs 12 execute the remainder of the instruction. Register 68 can again be employed for general scratch purposes.

Another mixed conditional mode arises if GP is "0" while GF are split between "0" and "1". In this case, all selected PEs 12 execute part of an instruction while only certain of selected PEs 12 execute the remainder. By appropriately allocating the bits in a group of instructions, the processor system can take on a merged dual personality in which one portion of each selected PE 12 performs unconditional instruction execution while another portion executes an IF-THEN-ELSE statement. This mixed mode and the previous one provide a great amount of flexibility.

If GP is "0" with GF all at "1", the mode is somewhat similar to that in which GP is "1" with GF all at "0". EF register 70 can now be employed as a general-purpose scratch register. Because GF are all "1", multiplexer 72 is disabled.

Setting GP and GF all to "1" fully overrides signals EP and EF/BLO. All of PEs 12 execute an instruction. This mode is used when execution is fully unconditional.

Figure 3:
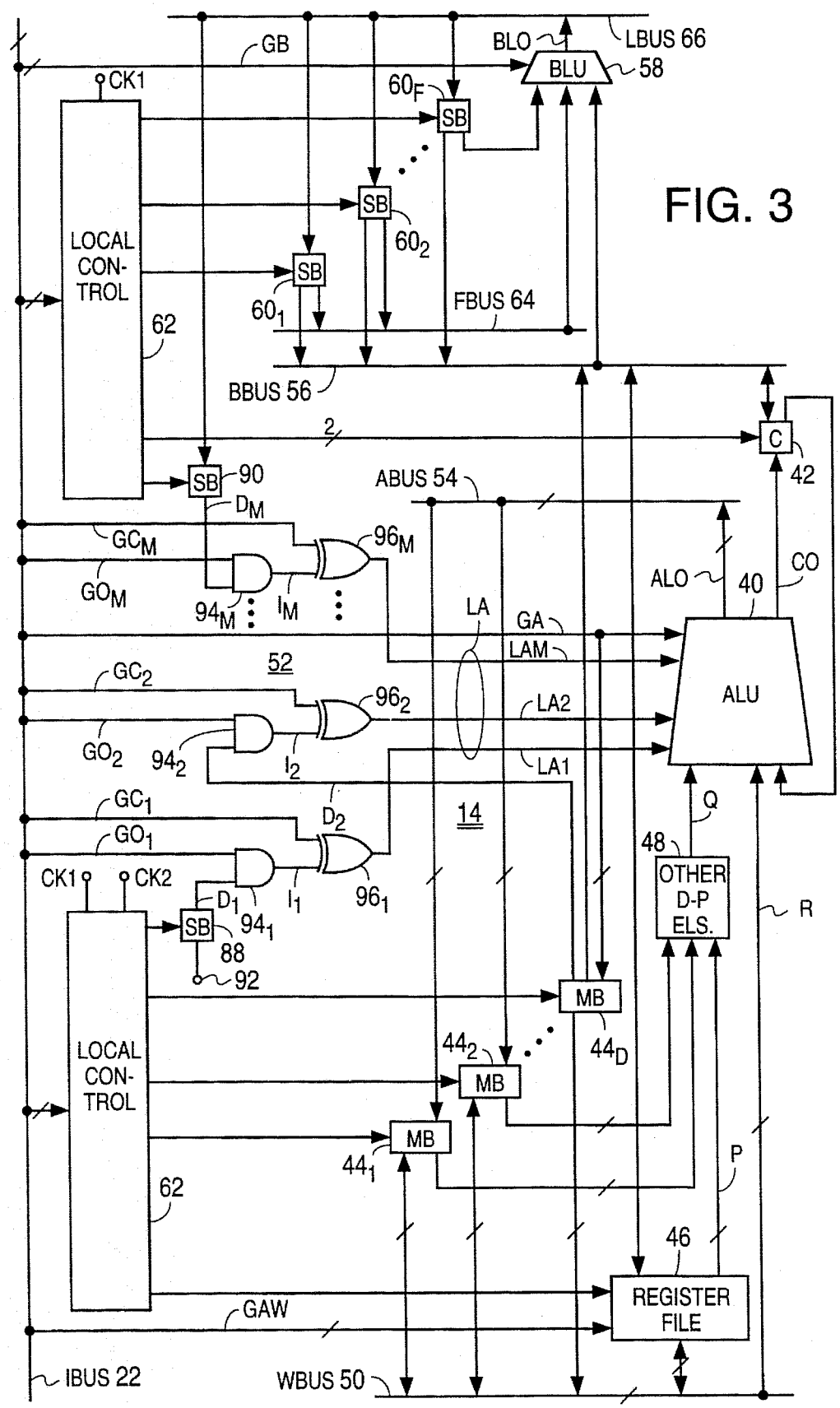

FIG. 3 shows a general implementation of processor 14 in which local control circuit 52 provides a selective-inversion local control capability. Components 40, 42, $44_1$–$44_D$, 46, 48, 58, $60_1$–$60_F$, and 62 in this implementation are all configured and operable the same as in FIG. 2. The components that form local control circuit 62 are simply shown as a pair of blocks in FIG. 3.

In addition to the preceding components, processor 14 in FIG. 3 contains a pair of one-bit registers 88 and 90 that may be situated at various places in processor 14. FIG. 3 illustrates an example in which register 88 is loaded from an internal point simply labeled as node 92. Register 90 is indicated as being loaded from LBUS 66. Circuit 62 can locally control registers 88 and 90 in the way described above.

Local control circuit 52 in FIG. 3 consists of M AND gates $94_1$, $94_2$, ... $94_M$ and M EXCLUSIVE OR gates $96_1$, $96_2$, ... $96_M$. Each gate $94_i$, where i is a running integer, produces an internal signal $I_i$ as the logical AND of (a) a global override instruction signal $GO_i$ and (b) a data-dependent input signal $D_i$ supplied from a component, typically a register, in processor 14. In the illustrated example, data-dependent signals $D_1$, $D_2$, and $D_M$ respectively come from registers 88, $44_D$, and 90. Each gate $96_i$ produces a local instruction signal $LA_i$ as the EXCLUSIVE OR of internal signal $I_i$ and a global instruction signal $GC_i$. Signals $LA_1$–$LA_M$ constitute local instruction signals LA that control the operation of ALU 40. With the foregoing in mind, control circuit 52 operates in the following manner.

When global signal $GO_i$ is "1", internal signal $I_i$ logically equals data-dependent signal $D_i$. Local signal $LA_i$ then (a) logically equals global signal $GC_i$ if signal $D_i$ is at "0" or (b) is logically inverse to signal $GC_i$ if signal $D_i$ is at "1". In other words, circuit 52 selectively inverts signal $GC_i$ depending on the $D_i$ value.

Setting global signal $GO_i$ to "0" overrides the local control provided with signal $D_i$. Local signal $LA_i$ is thereby provided a value logically equal to that of global signal $GC_i$.

The present selective-inversion local control capability is quite useful for certain arithmetic operations which entail performing one of two basically inverse steps depending on the value of a parameter and which normally require an IF-THEN-ELSE (or equivalent) statement. "2's complement" arithmetic is a primary example. By using the selective-inversion capability, one of the steps—e.g., "2's complement" addition—can be done in certain PEs 12 at the same time that the other step—e.g., "2's complement" substraction—is done in other PEs 12. Performing the operation in this way requires only about half the number of execution cycles that would be needed to do the operation with an IF-THEN-ELSE statement.

Figure 4:
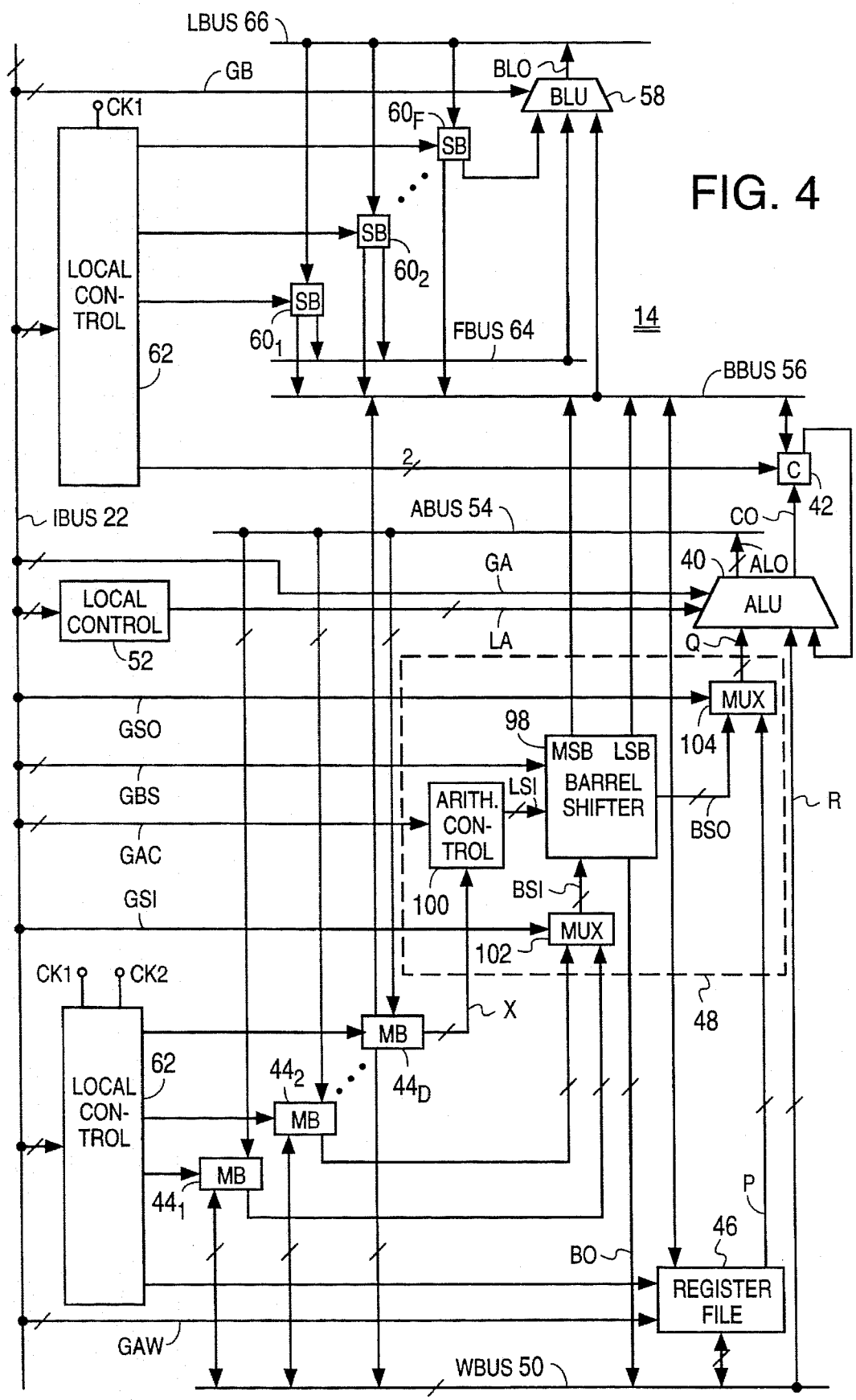

Data-path elements 48 preferably include a barrel shifter. Turning to FIG. 4, it illustrates a general implementation for processor 14 in which data-path block 48 contains a barrel shifter 98 whose shift magnitude is locally controlled. Processor 14 in FIG. 4 contains components 40, 42, $44_1$–$44_D$, 46, 52, 58, $60_1$–$60_F$, and 62 all arranged and operable as in FIG. 2. The components that form local control circuits 52 and 62 are simply shown as blocks in FIG. 4. In addition to barrel shifter 98, data-path block 48 in FIG. 4 includes an arithmetic control circuit 100, an input multiplexer 102, and an output multiplexer 104.

Responsive to global instruction signals GAC, arithmetic control 100 operates on certain bits X contained in a multi-bit register such as register $44_D$ to produce a multi-bit data-dependent local control signal LSI that establishes the magnitude of the bit shift. In response to a global instruction select signal GSI, multiplexer 102 transfers the multi-bit word in one of two equal-size multi-bit registers to barrel shifter 98. FIG. 4 illustrates the two registers as being registers $44_1$ and $44_2$. Responsive to local control signal LSI and to global instruction signals GBS, one of which establishes the direction of the bit shift, barrel shifter 98 shifts the bits in the supplied word to the left or right by the specified increment to produce a new multi-bit word BSO consisting of a portion of the original word BSI with "O's" in the vacated bit positions.

Responsive to a global instruction signal GSO, multiplexer 104 transfers either output BSO or register-file output P to ALU 40 as input Q. If output BSO is selected, it passes through ALU 40 and becomes output ALO which is loaded into one of registers $44_1$–$44_D$, typically the one that contained the original word. The entire shift operation takes one execution cycle. Because the shift increment depends on the value of data in register $44_M$, the shift amount can differ from one PE 12 to another.

The BSO shifted word can also be loaded onto word bus 50. The least significant bit or most significant bit of output BSO can be loaded onto BBUS 56.

Figure 5A:
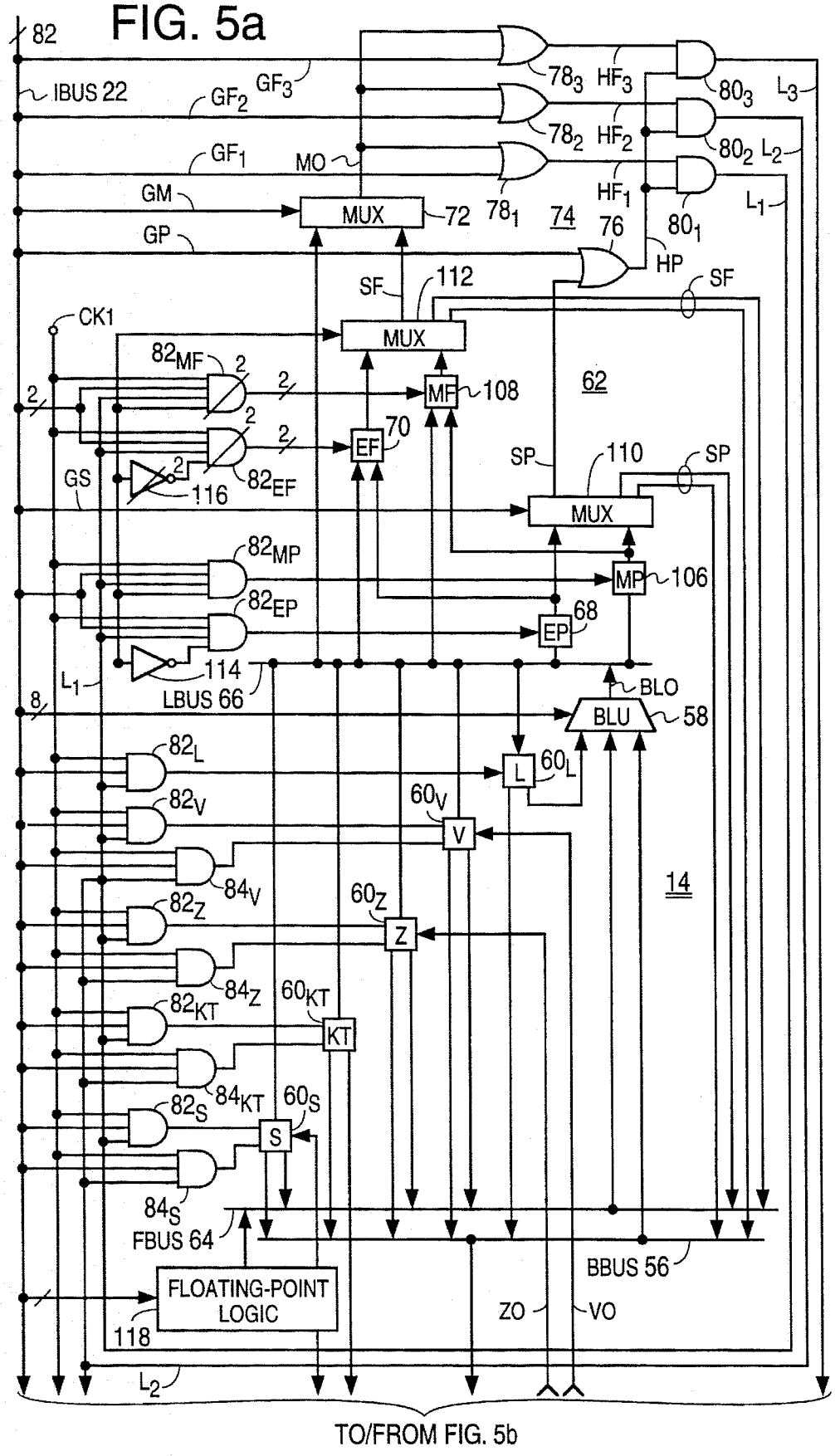
FIGS. 5a and 5b (jointly "FIG. 5") form a composite block/logic diagram of a specific implementation of the processor in FIG. 2, 3, or 4.
Figure 5B:
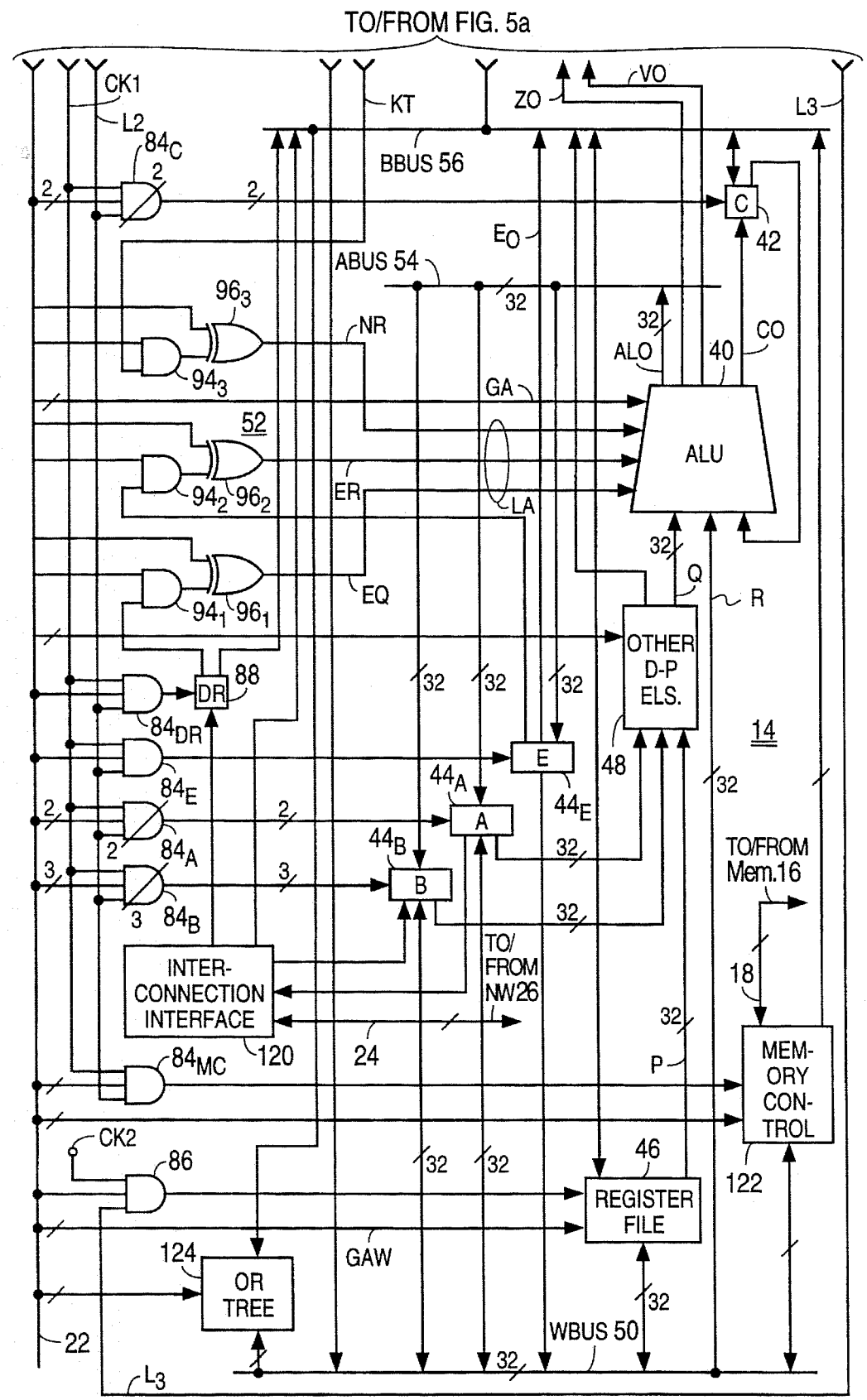

Moving to FIG. 5, it illustrates a composite preferred implementation of processor 14 in FIGS. 2–4. The subscript notation for some of the elements in FIG. 5 is different from that used in FIGS. 2–4. However, the main numerical portions of the reference symbols are the same. The analogies between the elements in FIG. 5 and those in FIGS. 2–4 should be obvious.

ALU 40 in FIG. 5 is a 32-bit device. Registers $44_B$, $44_A$, and $44_E$ that respectively store 32-bit words B, A, and E correspond to registers $44_1$–$44_D$ of FIGS. 2–4. Registers $44_A$ and $44_B$ can be used as a 64-bit accumulator for ALU 40. Register $44_E$ is an exponent register whose least significant bit $E_0$ is supplied to BBUS 56. Register file 46 consists of 64 32-bit randomly accessible registers (not shown). WBUS 50 and ABUS 54 are 32 bits wide.

One-bit registers $60_S$, $60_{KT}$, $60_Z$, $60_V$, and $60_L$ in FIG. 5 correspond to registers $60_1$–$60_F$ of FIGS. 2–4. These five registers in FIG. 5 respectively store general-purpose bits S and KT, a zero bit Z, an overflow bit V, and a logic accumulator bit L. The S bit is often used as a sign bit. The KT bit is often used for controlling (a) "2's complement" addition/substraction for local control circuit 52 and (b) arbitration to interconnect network 26. Registers $60_Z$ and $60_V$ respectively receive outputs ZO and VO from ALU 40. The L bit is supplied as the third input to BLU 58.

Local control circuit 62 contains the components shown in FIG. 2 plus a dedicated primary one-bit register 106 that stores an additional primary control bit MP, a dedicated further one-bit register 108 that stores an additional further control bit MF, and a pair of multiplexers 110 and 112. Control (or flag) registers 106 and 108 are interconnected with each other and with BLU 58 (via LBUS 66) in the same way that control registers 68 and 70 are so interconnected.

As with EP register 68, MP register 106 is not clocked during an IF-THEN-ELSE statement. The MP value thus stays the same during the statement.

The values of the EP and MP bits normally differ in at least one of PEs 12 prior to the beginning of an IF-THEN-ELSE statement. Consequently, the MP and EP bits define different sets of selected PEs 12 for conditional execution of the statement.

Multiplexer 110 selects either the EP bit or the MP bit in response to a global select instruction signal GS and provides a corresponding primary multiplexer output signal SP. Responsive to global signal GS, multiplexer 112 similarly selects either the EF bit, if the EP bit is selected, or the MF bit, if the MP bit is selected, and furnishes a corresponding further multiplexer output signal SF. Multiplexer outputs SP and SF in the implementation of FIG. 5 are utilized to achieve local control in the same respective ways that the EP and EF bits are utilized in FIG. 2. As indicated in FIG. 5, the SP and SF values are also loadable onto BBUS 56 and FBUS 64.

The clocking of registers 106 and 108 is controlled by respective AND gates $82_{MP}$ and $82_{MF}$ in the same manner that the clocking of registers 68 and 70 is controlled via gates $82_{EP}$ and $82_{EF}$. To avoid loss of state, the clocking inputs of registers 106 and 108 are disabled when the clocking inputs of registers 68 and 70 are enabled, and vice versa. This is accomplished with inverters 114 and 116 arranged as shown in FIG. 5.

Processor 14 further includes a floating-point logic circuit 118, an interconnection interface 120, a memory control circuit 122, and an OR TREE 124 all arranged as indicated in FIG. 5. Floating-point logic 118 accelerates floating-point calculations by handling exceptions and floating-point rounding. Interface 120 acts as a buffer between processor 14 and interconnection network 26 of FIG. 1. Memory control 122 provides access to local memory 16. Components 120 and 122 may be implemented in various ways, preferably in a manner such as that described in PCT Patent Publications WO 91/10197 and WO 91/10200. OR TREE 124 is a four-bit bus used in sending information from processor 14 back to ACU 20.

The number of local control signals $L_1$–$L_K$ is three in FIG. 5. Local control signal $L_1$ controls the clocking of one-bit registers $60_S$, $60_{KT}$, $60_Z$, $60_V$, $60_L$, 68, 70, 106 and 108. Local control signal $L_2$ controls the clocking of 32-bit registers $44_A$, $44_B$, and $44_E$ along with one-bit registers 42, $60_S$, $60_{KT}$, $60_Z$, $60_V$, and 88 and memory control 122. Register 88 stores a general-purpose bit DR. Local control line $L_3$ only controls register file 46.

Figure 6:
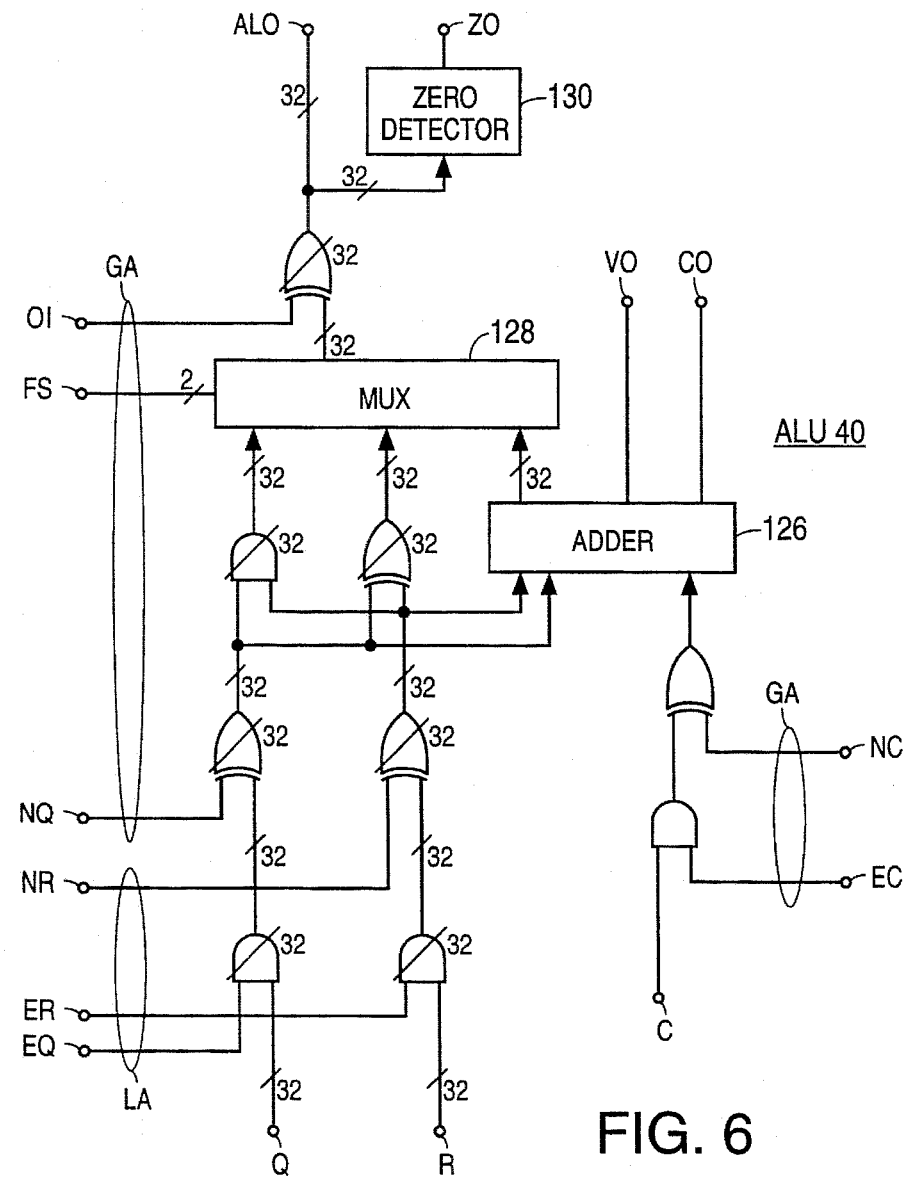
FIGS. 6 and 7 are respective block/logic diagrams of the arithmetic and Boolean logic units in FIG. 5.

The selective-inverting local control of ALU 40 is achieved with three local instruction signals LA consisting of a Q-data enable signal EQ, an R-data enable signal ER, and R-data invert signal NR. FIG. 6 illustrates the internal details for ALU 40. Global instruction signals GA in FIG. 6 consist of a Q data-invert signal NQ, a function-select signal FS, an ALU output invert signal OI, a carry enable signal EC, and a carry invert signal NC. Adder 126 preferably utilizes look-ahead carry. Function select FS enables multiplexer 128 to directly select an AND/NAND function, an EXCLUSIVE OR/EXCLUSIVE NOR function, or an add/subtract function. By virtue of DeMorgan's theorem, a NOR/OR function is achieved by selecting AND/NAND and asserting data-invert signals NQ and NR. Zero detector 130 determines when the bits of output ALO are all "0".

Figure 7:
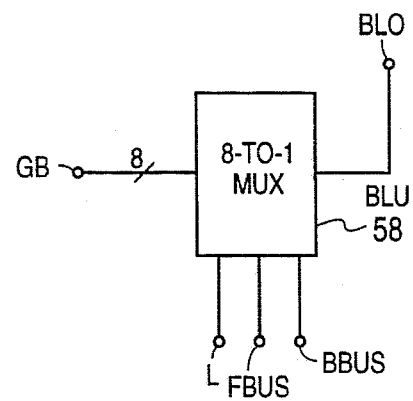

BLU 58 is an eight-to-one multiplexer responsive to eight global instruction signals GB. See FIG. 7. BLU 58 can perform any one of 256 Boolean logic operations coded in by global signals GB.

Figure 8:
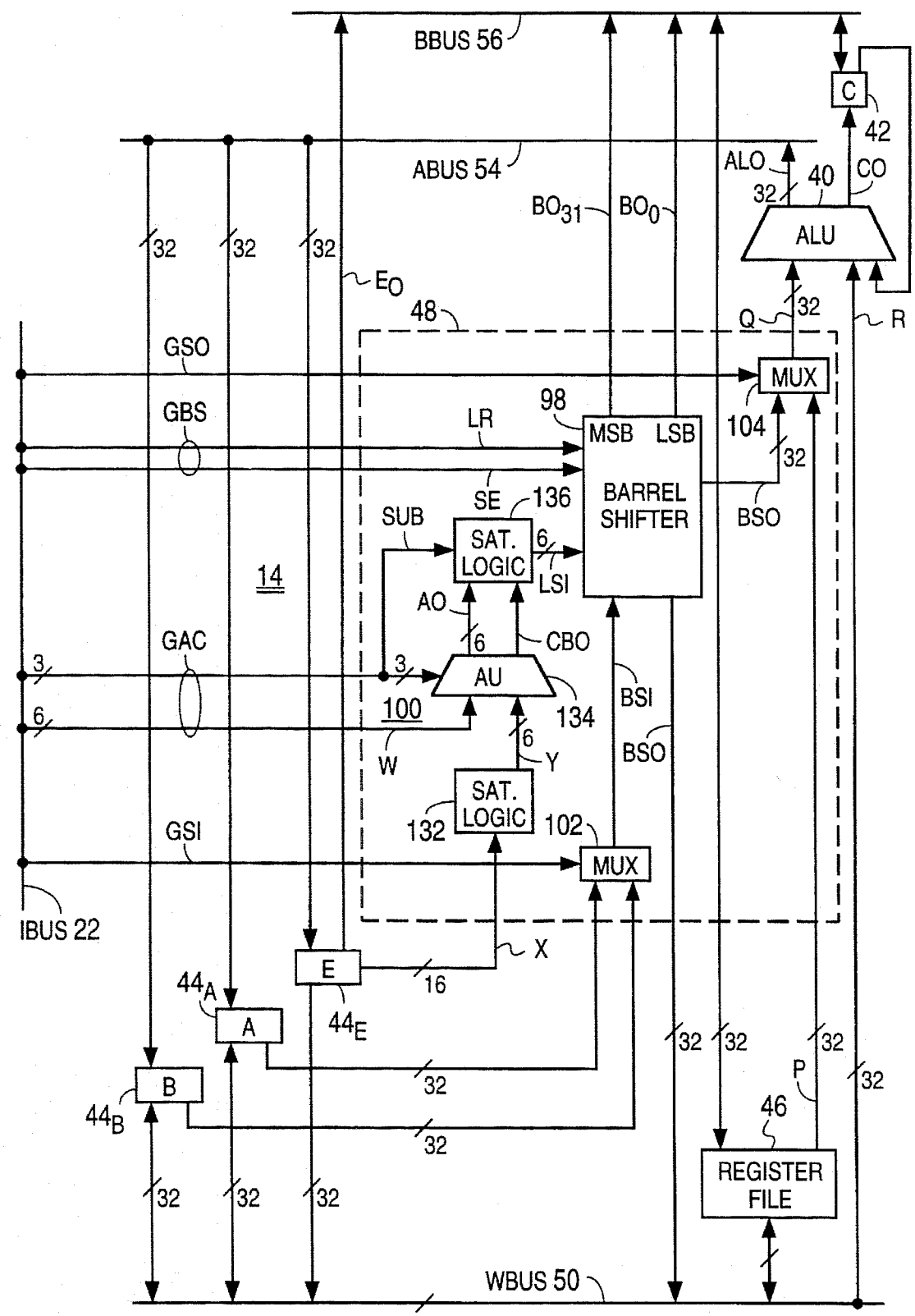
FIG. 8 is a block/logic diagram of a specific implementation of part of the processor in FIG. 5.

FIG. 8 illustrates a preferred embodiment of data-path elements 48, including the circuitry with which data-path block 48 closely interacts. Barrel shifter 98 is of conventional design. Global signals GBS for shifter 98 consist of a direction signal LR that determines whether the shift is to the left or right, and a signal SE that controls sign extension. Bits X supplied to arithmetic control 100 consist of the 16 least significant bits $E_0$–$E_{15}$ stored in exponent register $44_E$.

Control circuit 100 is formed with a saturation logic circuit 132, an arithmetic unit ("AU") 134, and a saturation logic circuit 136.

Signal X—i.e., bits $E_0$–$E_{15}$ from register $44_E$—is supplied to saturation logic 132 which treats signal X as a "2's complement" number. The most significant bit $E_{15}$ is the sign bit. The "2's complement" number is positive if $E_{15}$ is "0" and negative if $E_{15}$ is "1". Logic circuit 132 operates on signal X to produce a six-bit output Y according to Table I below.

TABLE I

| X | Action | Y |
|---|---|---|
| <0 | Saturate low | 0 |
| 0–32 | Pass | X |
| >32 | Saturate high | 32 |

Global signals GAC consist of a six-bit signal W, an arithmetic signal SUB, and two other signals. AU 134 receives signal Y and global signal W as inputs. In response to the remaining three global signals GAC, AU 134 performs one of five operations on signals W and Y to produce a corresponding six-bit main output AO along with a one-bit carry/borrow output CBO. The five operations are (a) pass Y, (b) pass W, (c) add W and Y, (d) subtract W from Y, and (e) subtract Y from W. Subtraction is done when SUB is "1". Addition or pass is done When SUB is "0".

Saturation logic 136 receives main output AO along with carry/borrow output CBO. In response to signal SUB, logic circuit 136 operates on signal AO according to Table II below to furnish local control signal LSI as a six-bit signal.

TABLE II

| SUB | CBO | AO | Action | LSI |
|---|---|---|---|---|
| 0 | 0 | 0–32 | Pass | AO |
| 0 | 0 | 33–63 | Saturate high | 32 |
| 0 | 1 | 0–63 | Saturate high | 32 |
| 1 | 1 | 0–32 | Pass | AO |
| 1 | 1 | 33–63 | Saturate high | 32 |
| 1 | 0 | 0–63 | Saturate low | 0 |

In Table II, a "1" for CBO when SUB is "0" means carry. A "0" for CBO when SUB is "1" means borrow.

Figure 9:
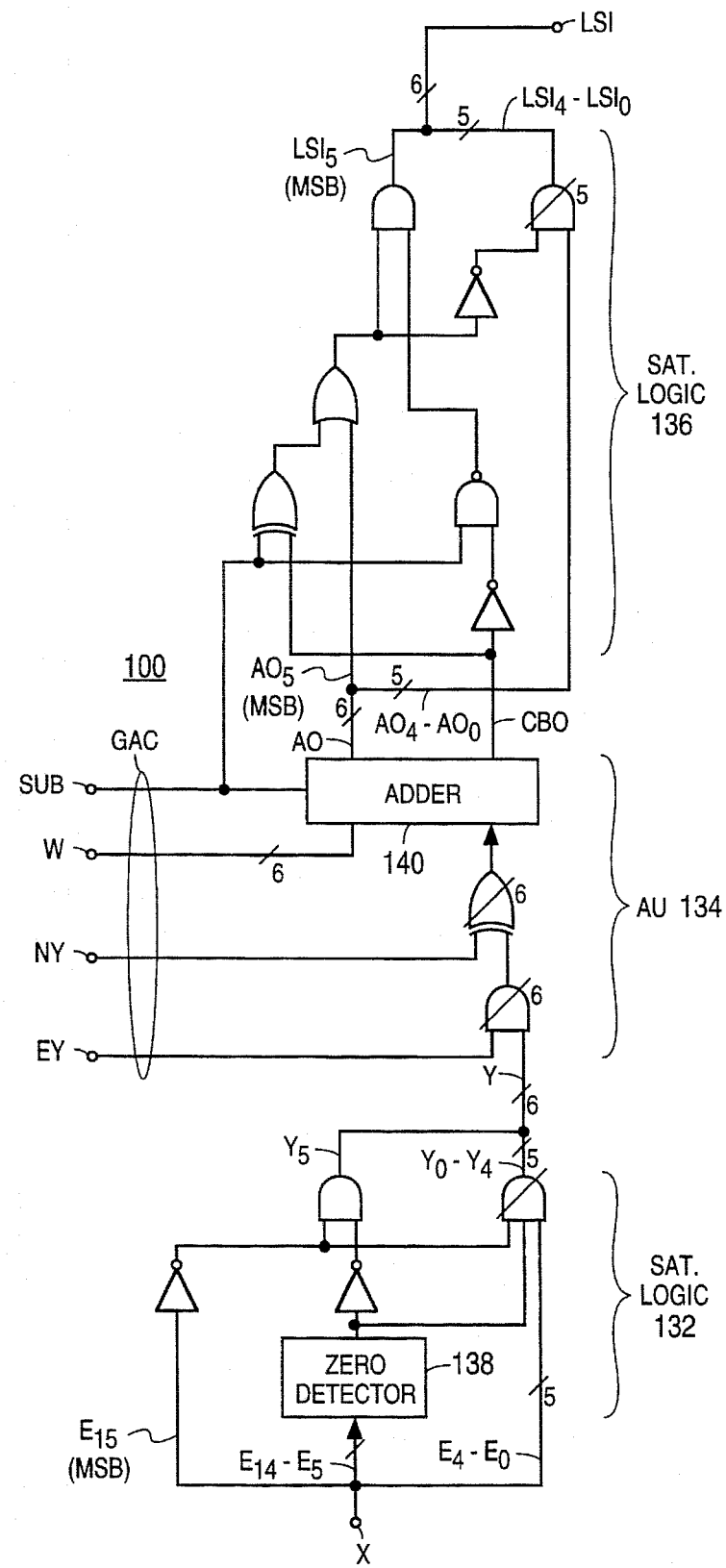
FIG. 9 is a block/logic diagram of a local control circuit for the barrel shifter employed in the processor of FIG. 8.

FIG. 9 depicts internal details for components 132–136 of arithmetic control 100. Zero detector 138 determines when bits $E_5$–$E_{14}$ from exponent register $44_E$ are all "0". In addition to signals SUB and W, global signals GAC include a Y-data enable signal EY and a Y-data invert signal NY. Adder 140 is a six-bit device that typically utilizes ripple carry.

Figure 10:
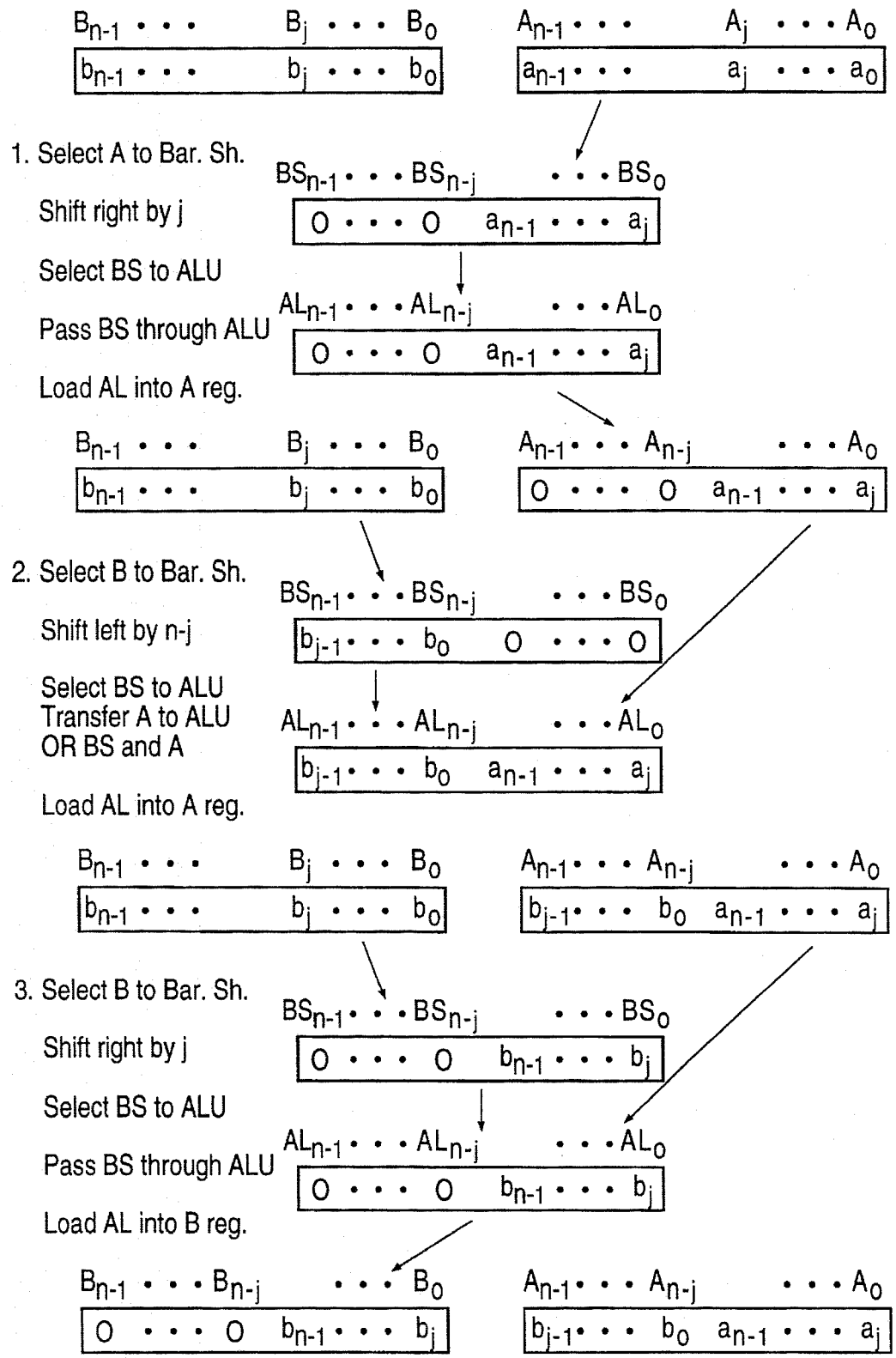
FIG. 10 is a flow chart for a type of barrel-shifter operation achievable with the invention.

In three execution cycles, processor 14 can perform a bit shift of 1–32 bits on registers $44_A$ and $44_B$ when they are utilized as a composite register containing a 64-bit word. FIG. 10 diagrammatically illustrates how this composite shift is done for the general case in which registers $44_A$ and $44_B$ are each n bits wide rather than specifically being 32 bits wide. In particular, FIG. 10 indicates a shift to the right by j bits.

The following notation is used in FIG. 10: $A_0$–$A_{n-1}$ and $B_0$–$B_{n-1}$ are the respective bit positions for A register $40_A$ and B register $40_B$; $a_0$–$a_{n-1}$ and $b_0$–$b_{n-1}$ are the respective initial values for $A_0$–$A_{n-1}$ and $B_0$–$B_{n-1}$; $BS_0$–$BS_{n-1}$ and $AL_0$–$AL_{n-1}$ are the respective transient bit positions for barrel shifter ("Bar. Sh.") 98 and ALU 40. The execution cycles are indicated by the numbers 1, 2, and 3. In the second execution cycle, the transfer of bits A to ALU 40 is done by way of WBUS 50 after which ALU 40 logically ORs signals BS and A. A shift to the left is done in precisely the opposite way to that indicated in FIG. 10.

The magnitude of the composite bit shift that can be attained according to the procedure shown in FIG. 10 is locally controllable and can therefore differ from PE 12 to PE 12. The ability to perform such a locally controllable composite bit shift makes the invention quite flexible, especially when the bit-shift feature is used with the other local control features described above.

While the invention has been described with reference to particular embodiments, this description is solely for the purpose of illustration and is not to be construed as limiting the scope of the invention claimed below. For example, the EP and EF bits need not always be stored in the same particular registers, as long as the registers that contain them are dedicated for use in locally controlling conditional execution of instructions. Three-state buffers or multiplexers could be used in combination with, or in place of, the clocking-control AND gates. A local control signal provided by logic circuit 74 could be used to disable the data input to a memory, such as a register file, while the memory retains its current state by a feedback technique.

NAND, NOR, and EXCLUSIVE NOR gates could alternatively be used to provide functions equivalent to those respectively furnished by the AND, OR, and EXCLUSIVE OR gates employed in the preferred embodiments of the inventions. Generation of a function according to the logical AND of certain signals therefore includes both AND and NAND. Likewise, generation of a function according to the logical OR of certain signals includes OR and NOR. Generation of a function according to the logical EXCLUSIVE OR of certain signals includes EXCLUSIVE OR and EXCLUSIVE NOR. By virtue of deMorgan's theorem, certain interchanges can be made among AND, NOR, OR, and NAND.

EXCLUSIVE OR and EXCLUSIVE NOR gates can be variously implemented with AND, OR, NAND, and NOR gates and inverters. Also, PLAs, multiplexers, and memory look-up tables could be used in place of discrete logic gates to perform the functions of circuits such as local control circuit 52, logic circuit 74, and arithmetic control circuit 100. Various modifications and applications may thus be made by those skilled in the art without departing from the true scope and spirit of the invention as defined in the appended claims.

What is claimed is:

1. A parallel processor system comprising:

a global control unit that supplies instructions in the form of global instruction signals;

an array of processing elements ("PEs") that process respective sets of data according to the instructions, each instruction being furnished in parallel to all of the PEs for enabling the system to operate in a single-instruction multiple-data mode, each PE comprising:

a processor unit that processes incoming data in response to processor instruction signals; and a local control circuit responsive to a data-dependent signal furnished in the PE for selectively inverting a specified one of the global instruction signals to produce a local instruction signal that constitutes one of the processor instruction signals, whereby the value of the local instruction signal can vary from PE to PE.

2. A system as in claim 1 wherein the local control circuit in each PE is responsive to a further one of the global instruction signals for enabling the local control circuit to selectively invert the specified global instruction signal.

3. A system as in claim 2 wherein the local control circuit in each PE comprises:
- a first logic element that produces an internal signal according to the logical AND of the data-dependent signal and the further global instruction signal; and
- a second logic element that produces the local instruction signal according to the logical EXCLUSIVE OR of the internal signal and the specified global instruction signal.

4. A system as in claim 1 wherein each PE includes a register that furnishes the data-dependent signal.

5. A parallel processor system comprising:
- a global control unit that supplies instructions in the form of global instruction signals;
- an array of processing elements ("PEs") that process respective sets of data according to the instructions, each instruction being furnished in parallel to all of the PEs for enabling the system to operate in a single-instruction multiple-data mode, each PE comprising:
   - main register circuitry that stores an original multi-bit word;
   - a barrel shifter that shifts bits in the original word to produce a new multi-bit word containing a portion of the bits in the original word shifted to the left or right by a specified shift amount, the barrel shifter being operable to enable the shift amount to exceed a distance of one in a single shift operation; and
   - a local control circuit that controls the shift amount according to a data-dependent signal furnished in the PE, whereby the shift amount can differ from PE to PE.

6. A system as in claim 5 wherein each PE includes further register circuitry that stores a further multi-bit word, at least part of which constitutes the data-dependent signal.

7. A system as in claim 6 wherein the local control circuit in each PE operates in response to the data-dependent signal and at least one of the global instruction signals to provide the PE with a shift-control signal that establishes the shift amount.

8. A system as in claim 5 wherein the main register circuitry in each PE comprises:
- a plurality of separately accessible individual registers for storing respective individual multi-bit words; and
- a selection circuit that supplies the original multi-bit word as a selected one of the individual multi-bit words.

9. A system as in claim 8 wherein, for each PE, the individual multi-bit words form a composite original multi-bit word, the PE being operative to produce a new composite multi-bit word containing part of the bits of the composite original multi-bit word shifted to the left or right by a specified shift amount.

10. A system as in claim 1 wherein the specified global instruction signal is a one-bit signal.

* * * * *